Figure 1:
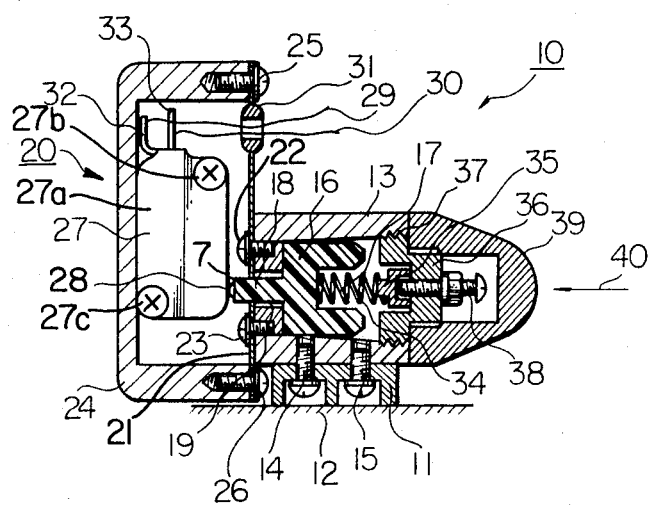

United States Patent
Haruna et al.

[15] 3,674,951
[45] July 4, 1972

[54] TRIGGER SWITCH FOR MOTOR VEHICLE SAFETY DEVICES

[72] Inventors: Takashi Haruna, Yokosuka; Kazutaka Taniguchi, Tokyo, both of Japan

[73] Assignee: Nissan Motor Company, Limited, Yokohama, Japan

[22] Filed: Feb. 19, 1971

[21] Appl. No.: 116,961

[30] Foreign Application Priority Data

March 18, 1970 Japan..................................45/26022

[52] U.S. Cl..........................................................200/61.53
[51] Int. Cl..........................................................H01h 35/14
[58] Field of Search................................200/61.45 R–61.53; 340/262; 280/150 AB

[56] References Cited

UNITED STATES PATENTS

| | | | |
|---|---|---|---|
| 3,571,539 | 3/1971 | Kaiser et al. | 200/61.53 |
| 3,549,169 | 12/1970 | Oldberg et al. | 200/61.53 X |
| 3,024,844 | 3/1962 | Hanes | 200/61.53 |

Primary Examiner—Robert K. Schaefer
Assistant Examiner—M. Ginsburg
Attorney—John Lezdey

[57] ABSTRACT

A trigger switch mechanism for actuating motor vehicle safety devices responsively to deceleration of a given magnitude resulting from a collision of the motor vehicle. The mechanism comprises a cylinder mounted on the vehicle body in a horizontal manner with a cylindrical weight mounted within the cylinder chamber for axial movement so that when the trigger switch mechanism is subjected to deceleration of a given magnitude in the one direction, a force of inertia forces the cylindrical weight to move axially in the opposite direction, allowing an actuator pin to extend so that a microswitch is closed.

1 Claim, 2 Drawing Figures

PATENTED JUL 4 1972

3,674,951

INVENTOR
TAKASHI HARUNA & KAZUTAKA TANIGUCHI
BY John Leyden
ATTORNEY

TRIGGER SWITCH FOR MOTOR VEHICLE SAFETY DEVICES

This invention relates to motor vehicle safety devices and more particularly to a trigger switch mechanism adapted to actuate such devices in response to deceleration of a given magnitude resulting from a collision of the motor vehicle.

Various motor vehicle safety devices have heretofore been proposed and demonstrated, including one having a netting or an air bag which is automatically positioned in a protective position in the even of a collision, thereby avoiding whip-lash injuries of the vehicle occupants. These devices, usually, employ explosive to initiate the netting or air bag into action. However, the use of such hazardous initiator sometimes jeopardizes the installation of the safety device of this type because of restrictions from local automotive regulations that prohibit the storage of hazardous materials in motor vehicles.

It is therefore an object of this invention to provide a new and improved trigger switch mechanism that enables actuation of motor vehicle safety devices without use of any hazardous material such as chemical explosives by sensing deceleration of a given magnitude resulting from a collision.

It is another object of this invention to provide a quick responding trigger switch mechanism for a motor vehicle safety device.

It is a further object of this invention to provide a trigger switch mechanism which is simple in construction and has an increased reliability.

Figure 2:
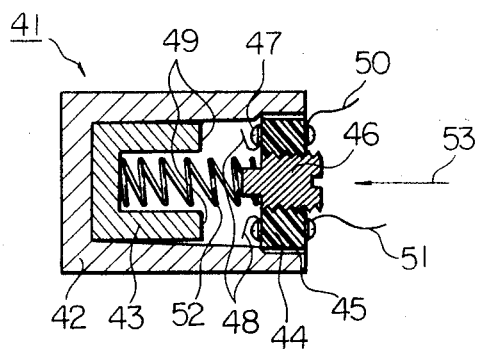

In the drawings:

FIG. 1 is a longitudinal section of a trigger switch mechanism embodying this invention; and FIG. 2 illustrates another embodiment of this invention.

Referring to FIG. 1, there is shown an example of the present trigger switch mechanism 10 which forms part of a motor vehicle safety device having a netting or an air bag (not shown). The trigger switch mechanism 10 comprises a base member 11 made of resilient material and mounted at a suitable position of the vehicle body 12.

A cylinder 13 is placed on the base member 11 in a horizontal manner and secured thereto as by screws 14 and 15. A cylindrical weight 16 is mounted within the cylinder chamber with a suitable clearance. The weight 16 has a cylindrical recess 17 formed in one end and a projection 18 axially extending from the other end. The projection 18 extends through an opening 19 formed in the end surface of the cylinder 13.

A switch assembly 20 is mounted to the cylinder 13 and comprises a mounting plate 21 attached to the end surface of the cylinder 13 as by screws 22 and 23, a U-shaped bracket 24 anchored at its ends to the mounting plate 21 as by screws 25 and 26, and a micro-switch 27 held in position on the bracket 24. The micro-switch 27 having a faceplate 27a held in place by screws 27b and 27c is of commercially available type in which it brakes a circuit in response to depression of an actuator pin 28. Connections to a control circuit for actuating a motor vehicle safety device (not shown) are made by lead wires 29 and 30 which extend through a bushing 31 mounted on the plate 21 and are connected to terminals 32 and 33, respectively. The micro-switch 27 is positioned relative to the cylinder 13 such that when the cylindrical weight 16 is in the position as shown in FIG. 1, viz., it is seated on the bottom of the cylinder 13 the projection 18 at its end 7 keeps the actuator pin 28 depressed thereby breaking a connection between the leads 29 and 30.

A coiled spring 34 is provided to normally keep the cylindrical weight 16 against the bottom of the cylinder 13. The coiled spring 34 is mounted at one end in the cylindrical recess 17 formed in the cylinder 13 and at the other end to a spring support 35. A circular pedestal 36 is secured to the internally threaded end 37 of the cylinder 13 and has the spring support 35 attached thereto by means of an adjustment screw 38. The force of compression of the coiled spring 34 can be adjusted by the adjustment screw 38. A cover 39 secured to the pedestal 36 serves to seal off the adjustment screw 38.

In operation, when the trigger switch mechanism 10 is subjected to deceleration of a given magnitude in the direction of arrow 40, for example, due to a collision, the cylindrical weight 16 is urged rightward by a force of inertia exerted thereto against the action of the coiled spring 34, allowing the actuator pin 28 of the micro-switch 27 to move to its extended position, so that circuit connection between the leads 29 and 30 is established. In this instance, it is important that the force of compression of the coiled spring 34 be of such a magnitude that the trigger switch mechanism 10 does not come into action in the event of a considerably small deceleration, for example, resulting from a light collision against a garage.

FIG. 2 shows another example of the present trigger switch mechanism 41. The mechanism 41 comprises a cylinder 42 in which an electrically conductive cylindrical weight 43 is mounted for sliding movement in a rightward direction as viewed in FIG. 2. A circular member 44 is secured to the internally threaded end 45 of the cylinder 42 and has an adjustment screw 46 threaded thereinto.

Two contact members 47 and 48 are attached to the circular member 44 at positions opposing to the circumferential end 49 of the cylindrical weight 43. Connections to the external control circuit (not shown) are made by leads 50 and 51 connected to the contact members 47 and 48, respectively. A coiled spring 52 is provided between the cylindrical weight 43 and the adjustment screw 46 to normally keep the weight 43 against the bottom of the cylinder 42. Similarly to the mechanism shown in FIG. 1, the force of compression of the coiled spring 52 is so adjusted that the electrically conductive cylindrical weight 42 is forced rightward to the position in which the contact members 47 and 48 are connected by way of the weight 43, when the trigger switch mechanism 41 is subjected to deceleration of a given magnitude in the direction of arrow 53.

It is to be understood that the trigger switch mechanisms as shown in FIGS. 1 and 2 can be made quickly responsive by having the inner diameter of the cylinders 13 and 42 progressively larger in a rightward direction so as to reduce frictional resistance between themselves and the cylindrical weights 16 and 43.

As has been described above, this invention provides a new and improved trigger switch mechanism for motor vehicle safety devices that enables actuation of such devices without use of any hazardous material such as chemical explosives by sensing deceleration of a given magnitude resulting from a collision.

What is claimed is:

1. In a trigger switch mechanism for sensing deceleration of a given magnitude resulting from a collision of the motor vehicle to actuate safety device mounted thereon, the improvement comprising a base member made of resilient material and mounted at a suitable position of the vehicle body of said motor vehicle, a cylinder placed on said base member in a horizontal manner and secured thereto, said cylinder having a cylinder chamber therein, a cylindrical weight mounted within said cylinder chamber with a suitable clearance for axial movement, said cylindrical weight having a cylindrical recess formed in one end and a projection axially extending from the other end and extending through an opening formed in the surface of said cylinder, a coil spring for urging said cylindrical weight axially in one direction, a circular pedestal secured to the end of said cylinder and having a spring support attached thereto by an adjusting screw which adjusts the force of compression of said coil spring, said coil spring being mounted at one end in said cylindrical recess of said cylindrical weight and at the other end to said spring support, the force of compression of said coil spring being of such a magnitude as to permit said cylindrical weight to move axially in the opposite direction when the present trigger switch mechanism is subjected to deceleration of a given magnitude in one direction, and a switch assembly mounted on said cylinder and responsive to movement of said cylindrical weight in the opposite direction to make a circuit leading to said safety devices for thereby actuating said safety devices, said switch assembly including a mounting plate attached to the end surface of said cylinder, a U-shaped bracket anchored at its ends to said mounting plate, and a micro-switch having an actuator pin which is normally depressed by the projection extending from said cylindrical weight in the one direction and which is movable to its extended position upon movement of said cylindrical weight in the opposite direction.

* * * * *